(12) United States Patent
Colevas et al.

(10) Patent No.: US 10,838,591 B2
(45) Date of Patent: Nov. 17, 2020

(54) SYSTEMS AND METHODS FOR CUSTOMIZED NAVIGATION MENUS

(71) Applicant: CAPITAL ONE SERVICES, LLC, McLean, VA (US)

(72) Inventors: Alexandra Colevas, Arlington, VA (US); Michael Mossoba, Arlington, VT (US); Joshua Edwards, Philadelphia, PA (US); Abdelkader Benkreira, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/367,826

(22) Filed: Mar. 28, 2019

(65) Prior Publication Data

US 2020/0310598 A1 Oct. 1, 2020

(51) Int. Cl.
*H04M 3/493* (2006.01)
*G06F 3/0482* (2013.01)
*G06N 20/00* (2019.01)
*G06F 3/16* (2006.01)

(52) U.S. Cl.
CPC ............ *G06F 3/0482* (2013.01); *G06F 3/167* (2013.01); *G06N 20/00* (2019.01)

(58) Field of Classification Search
CPC .............................................. G06F 2203/0381
See application file for complete search history.

(56) References Cited

U.S. PATENT DOCUMENTS

| 5,802,526 | A | 9/1998 | Fawcett et al. |
| 6,751,306 | B2 | 6/2004 | Himmel et al. |
| 7,065,188 | B1 | 6/2006 | Mei et al. |
| 8,000,454 | B1 | 8/2011 | Or-Bach et al. |
| 8,731,148 | B1* | 5/2014 | Lavian ............. H04M 3/493 379/88.01 |
| 2003/0161464 | A1 | 8/2003 | Rodriguez et al. |
| 2007/0038633 | A1* | 2/2007 | Bergman ........... G06F 9/453 |
| 2014/0064463 | A1 | 3/2014 | Reddy |
| 2014/0079195 | A1 | 3/2014 | Srivastava et al. |
| 2016/0006730 | A1* | 1/2016 | Chari ............... G06F 21/32 726/7 |
| 2017/0031575 | A1* | 2/2017 | Dotan-Cohen ..... G06F 3/038 |
| 2017/0180552 | A1* | 6/2017 | Krinsky ........... H04M 3/5158 |
| 2018/0176378 | A1* | 6/2018 | Hollenberg ........ G10L 15/22 |
| 2019/0163710 | A1* | 5/2019 | Haghighat Kashani ............ G06F 16/9535 |

* cited by examiner

*Primary Examiner* — Justin S Lee
(74) *Attorney, Agent, or Firm* — Hunton Andrews Kurth LLP

(57) ABSTRACT

Systems and methods for generating personalized navigation menus are disclosed. For example, the system may include one or more memory units storing instructions and one or more processors configured to execute the instructions to perform operations. The operations may include receiving account data associated with a plurality of accounts and receiving navigation menu data associated with the accounts. The operations may include training a model based on the account data and the navigation menu data. The operations may include receiving a request associated with a user and receiving user account data associated with the user. The operations may include generating, using the model, a navigation menu based on the request and the user account data. The operations may include providing the navigation menu.

20 Claims, 8 Drawing Sheets

SYSTEMS AND METHODS FOR CUSTOMIZED NAVIGATION MENUS

BACKGROUND

Conventional systems and methods for providing navigation menus in an interface typically consist of providing set of default options to users (e.g., visitors and/or callers). Navigation menus may include a series of prompts (e.g., questions, labels, information, or other data), and users may provide responses to these prompts. For example, a navigation menu may be provided to user (e.g., a consumer, a member, an account holder) making a contact by phone, visiting a website, or using an app. Typically, a user initiates a request for a particular desired outcome (e.g., checking an account status) but may need to navigate through multiple prompts irrelevant to the desired outcome. This cumbersome and inefficient process wastes time and wastefully consumes resources (e.g., bandwidth, processing power, etc.).

Although some solutions have been proposed, conventional solutions lack efficiency and effectiveness. One conventional approach includes allowing a user to configure preferences for navigation menus in advance. However, this approach is limited at least because it requires active user participation and has limited flexibility. After configuring preferences, a user may later initiate a request for a desired outcome that requires navigation through multiple, irrelevant prompts. Another conventional approach is to use systems that may allow a user reach particular prompt or set of prompts without navigating through all intermediate prompts (e.g., an Interactive Voice Response (IVR) system). However, this approach is inefficient because it requires user input to reach a desired outcome and typically requires rule-based programming involving the prompts.

Therefore, in view of the shortcomings and problems with conventional approaches to providing navigation menus, there is a need for unconventional approaches to providing navigation menus that are efficient, effective, and customizable and anticipate a desired outcome.

SUMMARY

The disclosed embodiments provide unconventional methods and systems for generating navigation menus, including interactive voice response (IVR) menus. As compared to conventional solutions, the embodiments include efficient, effective and customizable methods of generating navigation menus, providing prompts, and routing signals. In some embodiments, systems and methods may anticipate a desired outcome and dynamically generate a navigation menu. Some embodiments may include machine learning systems and methods in addition to or instead of rule-based programming methods to generate navigation menus.

Consistent with the present embodiments, a system for generating navigation menus is disclosed. The system may include one or more memory units storing instructions and one or more processors configured to execute the instructions to perform operations. The operations may include receiving account data associated with a plurality of accounts and receiving navigation menu data associated with the accounts. The operations may include training a model based on the account data and the navigation menu data. The operations may include receiving a request associated with a user and receiving user account data associated with the user. The operations may include generating, using the model, a navigation menu based on the request and the user account data. The operations may include providing the navigation menu.

Consistent with the present embodiments, a method for generating navigation menus is disclosed. The method may include receiving account data associated with a plurality of accounts and receiving navigation menu data associated with the accounts. The method may include training a model based on the account data and the navigation menu data. The method may include receiving a request associated with a user and receiving user account data associated with the user. The method may include generating, using the model, a navigation menu based on the request and the user account data. The method may include providing the navigation menu.

Consistent with other disclosed embodiments, non-transitory computer readable storage media may store program instructions, which are executed by at least one processor device and perform any of the methods described herein.

The disclosed systems and methods may be implemented using a combination of conventional hardware and software as well as specialized hardware and software, such as a machine constructed and/or programmed specifically for performing functions associated with the disclosed method steps. The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Figure 1:
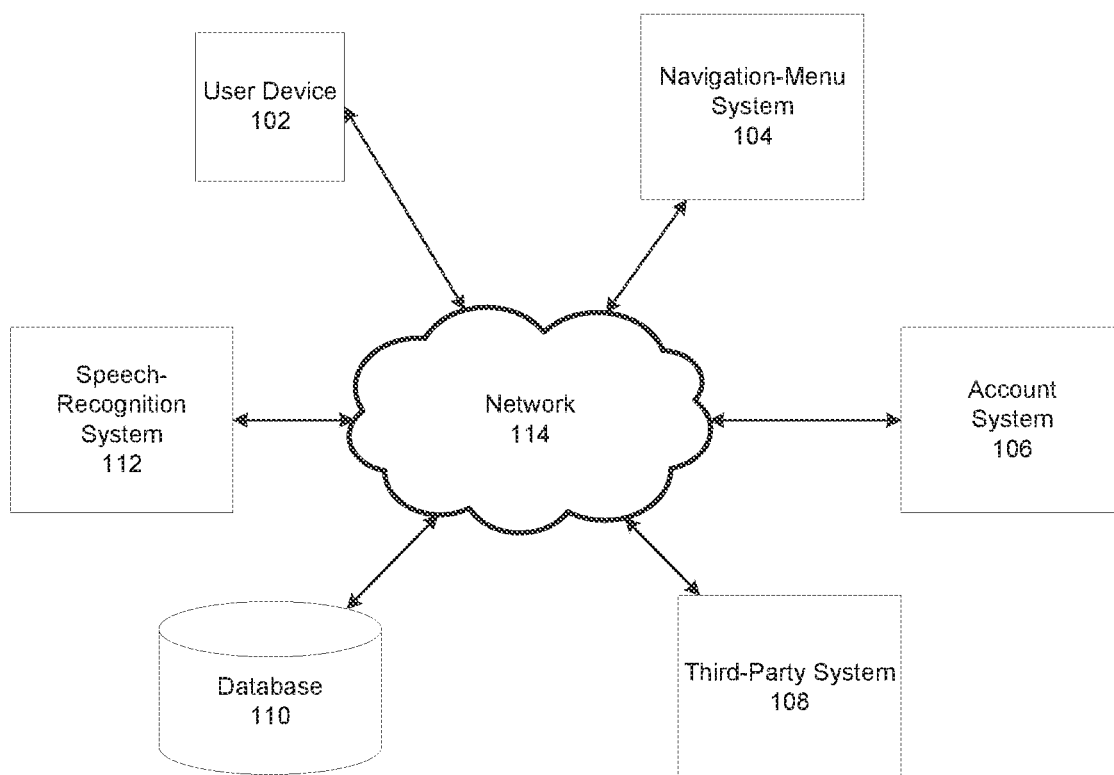
FIG. 1 depicts an exemplary system for generating navigation menus, consistent with disclosed embodiments.

Consistent with disclosed embodiments, systems and methods to generate navigation menus are disclosed. Systems and methods may involve navigation menus of various types, including interactive voice response (IVR) menus (e.g., a customer-service menu provided to a caller), displayed navigation menus (e.g., website menus, app menus, user-interface menus), and/or other navigation menus.

Embodiments consistent with the present disclosure may include account data. The account data may be associated with a user (i.e., user-account data) and/or more than one user. In some embodiments, an account may be a financial account (e.g., a credit card or bank), an insurance account, a healthcare-provider account, a utility account (e.g., a telephone, mobile phone, gas, electric, or water account), a user account, a service account (e.g., an automobile service account), a merchant account (e.g., an online store account), an email account, a messaging account, a membership account, an educational account, and/or any other account. Account data may include data related to an account status (e.g., a classification of the account, a balance, a number of messages, data used, a length of time an account has been active, etc.) and/or an account event (e.g., a call, a transaction, an order, a message sent or received, a download or upload, a synchronization of a file or message, a change of an account setting, etc.). Account data may include transaction data (e.g., payment data, charge data, and/or deposit data), healthcare data, service data, messaging data, purchase data, educational data, utility data, electricity data, water data, call data, Short Message Service (SMS) data, messaging data, email data, and/or other data.

Embodiments consistent with the present disclosure may include request data. Request data may be related to a request for an account service. The request may be associated with a user (i.e., user-request data) and/or an account. For example, request data may include a desired outcome, including to check an account status, schedule an event, report fraud, change an address, determine whether an anticipated account event occurred, etc. Request data may include phone number, an IP address, location data, time data (e.g., the time of a request for service, the duration of a service call, etc.), user-satisfaction data (e.g., data indicating whether a service issue was resolved), or other data associated with a request for an account service. Request data may include data associated with an IVR process (e.g., audio data comprising responses to prompts).

Embodiments consistent with the present disclosure may include navigation menus comprising navigation-menu data. Navigation-menu data may include data specifying a configuration of prompts and/or prompt data. Prompt data may include audio data, text data, numeric data, image data, video data, IVR data, and/or any other data. For example, prompt data may include a statement (e.g., "press 1 for customer service"), a label (e.g., "Pharmacy Department"), a question (e.g., "are you calling to check your account balance?"), information (e.g., "your next scheduled appointment is Oct. 8, 2020"), and/or any other data. Navigation-menu data may include prompt selection data (e.g., previously selected prompts, statistics relating to selected prompts for one or more requests and/or one or more users, etc.). In some embodiments, prompts of navigation-menus may be organized into one or more levels (e.g., Level 1, Level 2, and Level 3). Within a level, an order of prompts flows from top to bottom of the diagram. In some embodiments, prompts may be organized according to an order that influences the order in which prompts may be provided (e.g., displayed or played). As one of skill in the art will appreciate, navigation-menus may include prompts configured according to any network structure (e.g., node-edge structure). Examples navigation-menus provided herein are illustrative only and not limiting on the embodiments.

Embodiments consistent with the present disclosure may include navigation-menu rules. A navigation-menu rule may include a logical expression that specifies an element of a configuration of a navigation menu when a condition satisfied. For example, the condition may include determining whether request data is associated with a phone number, a location, an IP address, a time of day, a user, etc. In some embodiments, the condition may involve account data (e.g., determining whether a deposit is above a threshold amount) or an account status (e.g., determining whether a balance is past due). In some embodiments, an element of a configuration of a navigation menu may include specifying a predetermined prompt at a predetermined position of the configuration (e.g., an option to speak to an operator must be presented at the first position at each level of a navigation menu). A navigation-menu rule may include a user preference (e.g., a language preference). As one of skill in the art will appreciate, examples of navigation-menu rules provided herein are illustrative only and other navigation-menu rules are possible.

Embodiments consistent with the present disclosure may include activity data. Activity data may include location data, cookie data, website history data, viewing history data (e.g., online video streaming activity), shopping history data, transaction data, internet search data, social media data, or other activity data. Activity data may be associated with a user (e.g. user-activity data), more than one user, an account, and/or more than one account.

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

FIG. 1 depicts exemplary system 100 for generating navigation menus, consistent with disclosed embodiments. As shown, system 100 may include a user device 102, a navigation-menu system 104, an account system 106, a third-party system 108, a database 110, and a speech-recognition system 112. Components of system 100 may be connected to each other through a network 114.

In some embodiments, aspects of system 100 may be implemented on one or more cloud services designed to generate ("spin-up") one or more ephemeral container instances in response to event triggers, assign one or more tasks to a container instance, and terminate ("spin-down") a container instance upon completion of a task. By implementing methods using cloud services, disclosed systems may efficiently provision resources based on demand and provide security advantages because the ephemeral container instances may be closed and destroyed upon completion of a task. That is, the container instances do not permit access from outside using terminals or remote shell tools like SSH, RTP, FTP, or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of user devices, navigation-menu systems, account systems, third-party systems, databases, speech-recognition systems, and/or networks. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

User device 102 may include one or more memory units and one or more processors configured to perform operations consistent with disclosed embodiments. In some embodiments, user device 102 may include hardware, software, and/or firmware modules. User device 102 may be a mobile device, a tablet, a personal computer, a terminal, a kiosk, a server, a server cluster, a cloud service, a storage device, a specialized device configured to perform methods according to disclosed embodiments, or the like. User device 102 is disclosed in greater detail below (in reference to FIG. 4).

Navigation-menu system 104 may include a computing device, a computer, a server, a server cluster, a plurality of clusters, and/or a cloud service, consistent with disclosed embodiments. Navigation-menu system 104 may include one or more memory units and one or more processors configured to perform operations consistent with disclosed embodiments. Navigation-menu system 104 may include computing systems configured to generate, receive, retrieve, store, and/or provide navigation menus, consistent with disclosed embodiments. Navigation-menu system 104 may include computing systems configured to generate and train models, consistent with disclosed embodiments. Navigation-menu system 104 may be configured to receive data from, retrieve data from, and/or transmit data to other components of system 100 and/or computing components outside system 100 (e.g., via network 114). In some embodiments (not shown), navigation-menu system 104 may be a component of another component or system of system 100 (e.g., account system 106). Navigation-menu system 104 is disclosed in greater detail below (in reference to FIG. 3).

Account system 106 may include one or more memory units and one or more processors configured to perform operations consistent with disclosed embodiments. Account system 106 may include a computing device, a computer, a server, a server cluster, a plurality of clusters, and/or a cloud service, consistent with disclosed embodiments. Account system 106 may be configured to generate and train models, consistent with disclosed embodiments. Account system 106 may be configured to receive data from, retrieve data from, and/or transmit data to other components of system 100 and/or computing components outside system 100 (e.g., via network 114). In some embodiments (not shown), account system 106 may be a component of navigation-menu system 104.

Account system 106 may be configured to manage data (e.g., monitor, analyze, store, and/or provide data), consistent with disclosed embodiments. The data may include account data, request data, navigation-menu data, and/or navigation-menu rules (as previously described). In some embodiments, account system 106 may be configured to generate and/or provide navigation menus. In some embodiments, account system 106 may be configured to generate and/or provide prompts. In some embodiments, account system 106 may be configured to conduct an IVR process (e.g., in coordination with speech-recognition system 112 and/or navigation-menu system 104).

Account system 106 may be configured to route signals, consistent with disclosed embodiments. For example, account system 106 may be configured to route call signals, internet connection signals, and/or other signals. As an example, account system 106 may be configured to route a call to a department and/or to route a website visitor to an internet page.

Third-party system 108 may be configured to manage activity data (e.g., monitor, analyze, store, and/or provide activity data) associated with a user or an account, consistent with disclosed embodiments. Third-party system 108 may include one or more memory units and one or more processors configured to perform operations consistent with disclosed embodiments. Third-party system 108 may include a computing device, a computer, a server, a server cluster, a plurality of clusters, and/or a cloud service, consistent with disclosed embodiments. Third-party system 108 may be configured to receive data from, retrieve data from, and/or transmit data to other components of system 100 and/or computing components outside system 100 (e.g., via network 114). In some embodiments, the activity data may include at least one of location data, cookie data, website history data, viewing history data (e.g., online video streaming activity), shopping history data, transaction data, internet search data, social media data, or other activity data. In some embodiments, third-party system 108 may include a social media system.

Database 110 may include one or more databases configured to store data for use by system 100, consistent with disclosed embodiments. Database 110 may include a cloud-based database (e.g., AMAZON WEB SERVICES RELATIONAL DATABASE SERVICE) or an on-premises database. Database 110 may include request data, model data (e.g., model parameters), activity data, account data, navigation-menu data, and/or navigation-menu rule data, consistent with disclosed embodiments. Database 110 may include data received from one or more components of system 100 and/or computing components outside system 100 (e.g., via network 114).

Speech-recognition system 112 may be configured to identify speech in an audio signal and/or to convert speech to text, consistent with disclosed embodiments. Speech-recognition system 112 may include one or more memory units and one or more processors configured to perform operations consistent with disclosed embodiments. Speech-recognition system 112 may include a computing device, a computer, a server, a server cluster, a plurality of clusters, and/or a cloud service, consistent with disclosed embodiments. In some embodiments, speech-recognition system 112 may be provided as a service (e.g., MICROSOFT COGNITIVE SERVICES). Speech-recognition system 112 may be configured to generate and train models, consistent with disclosed embodiments. Speech-recognition system 112 may be configured to receive data from, retrieve data from, and/or transmit data to other components of system 100 and/or computing components outside system 100 (e.g., via network 114). In some embodiments (not shown), speech-recognition system 112 may be a component of another component or system of system 100, for example navigation-menu system 104 or account system 106. In some embodiments, speech-recognition system is configured for IVR processes.

Speech-recognition system 112 may include programs for voice and speech recognition processes. Speech-recognition system 112 may include voice recognition algorithms. Speech-recognition system 112 may include algorithms to convert speech to text and/or identify a speaker. Speech-recognition system 112 may include a machine learning model. Speech-recognition system 112 may include at least one of neural network model, a deep learning model, a conversational model, a supervised model, a hidden Markov model, a self-learning model, a discriminative learning model, a Bayesian learning model, a structured sequence learning model, an adaptive learning model, a statistical model, and/or another machine learning model. In some embodiments, speech-recognition system 112 is configured to train machine learning models.

At least one of user device 102, navigation-menu system 104, account system 106, third-party system 108, database 110, and speech-recognition system 112 may connect to network 114. Network 114 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. Network 114 may be connected to other networks (not depicted in FIG. 1) to connect the various system components to each other and/or to external systems or devices. In some embodiments, network 114 may be a secure network and require a password to access the network.

Figure 2:
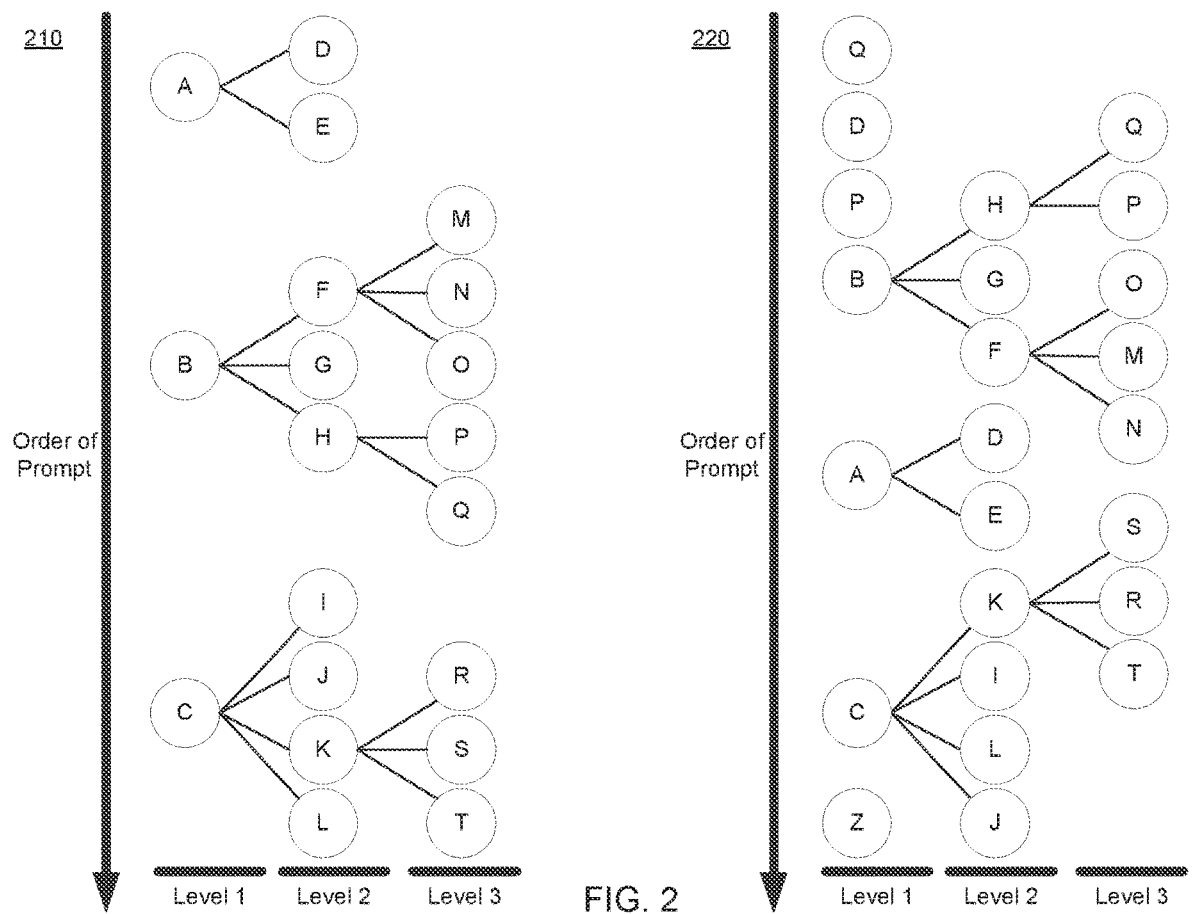
FIG. 2 depicts exemplary navigation menus, consistent with disclosed embodiments.

FIG. 2 depicts exemplary navigation menus, consistent with disclosed embodiments. FIG. 2 presents a first navigation menu 210 with a first configuration (i.e., organization of prompts) and a second navigation menu 220 with a second configuration. In some embodiments, navigation-menu system 104 may generate and/or provides navigation menu 210 and/or navigation menu 220. Generating a navigation menu may include selecting prompts to include in the navigation menu. Generating a navigation menu may include setting a configuration of the navigation menu (i.e., organizing prompts into one or more levels and/or setting an order of prompts), consistent with disclosed embodiments.

Providing a navigation menu may include displaying, playing, and/or transmitting navigation-menu data. For example, providing a navigation menu may include providing a prompt (e.g., displaying, playing, and/or transmitting a prompt), consistent with disclosed embodiments. In some embodiments, navigation-menu system 104 may transmit a prompt to user device 102. For example, navigation-menu system 104 may transmit a prompt in response to a received call from a user device 102. An interface may display prompts (e.g., a display of user device 102). A speaker may play prompts (e.g., a speaker of user device 102). As another example, navigation-menu system 104 may transmit a prompt to account system 106 (e.g., in response to data received from account system 106). For example, account system 106 may receive a request (e.g., a website request, a call, an SMS message) and transmit request data to navigation-menu system 104 based on the request. In some embodiments, providing a prompt may include routing a signal. A signal may include a call signal, an internet connection signal, and/or any other signal.

As shown, navigation menus of FIG. 2 include a plurality of prompts labelled as "A" through "T" and "Z". Navigation menus may organize prompts into a Level 1, a Level 2, and a Level 3, as shown in FIG. 2. Within a level, an order of prompts may flow from top to bottom of the diagram. In some embodiments, the order of prompts may determine the order in which prompts are played over a speaker. In some embodiments, the order of prompts may determine the order in which prompts appear in a list or the order in which prompts are displayed in a sequence. In some embodiments, prompts of only one level may be provided until a prompt is selected. In FIG. 2, lines between prompts represent possible navigation pathways through the prompts of navigation menus 210 and 220. A navigation pathway includes a possible sequence of selections through a navigation menu. In some embodiments, a prompt may be provided based on a selection of another prompt.

For example, navigation-menu system 104 may receive data (e.g., request data) and provide prompts in Level 1 of navigation menu 210 in response. For example, the system may provide prompts A, B, and C based on received request data. Navigation-menu system 104 may receive additional request data and select prompt A based on the additional request data. The system may provide prompts D and E based on the selection of prompt A. In some embodiments, prompts may be selected based on data received from a component of system 100. In some embodiments, navigation-menu system 104 may receive data from another component of system 100, a computing component outside system 100, and/or a connected component such as a keyboard, a touchscreen, a mouse, a microphone, a dial, a knob, a switch, and/or another input device (e.g., I/O devices 320, discussed in further detail in relation to FIG. 3 below).

As shown in relation to navigation menu 210, navigation-menu system 104 may provide Level 1 prompts in the following order: prompt A, followed by prompt B, then prompt C. If prompt B is selected, the system may provide Level 2 prompts of navigation menu 210 that are associated with the prompt B. That is, the system may provide prompt F, then prompt G, then prompt H. If prompt F is selected, the system may provide Level 3 prompts of navigation menu 210 that are associated with prompt F. That is, the system may provide prompt M, then prompt N, then prompt O.

In some embodiments, navigation menu 220 may be another configuration of navigation menu 210. For example, navigation menu 210 may be a default navigation menu and navigation menu 220 may be a customized navigation menu. Alternatively, navigation menu 210 may be a first customized navigation menu and navigation menu 220 may be a second customized navigation menu. As yet another example, navigation menu 210 may be a customized navigation menu and navigation menu 220 may be a default navigation menu.

To explain in further detail, navigation menu 220 may include prompts of navigation menu 210 (e.g., prompts A through T, as shown). In addition, as compared to navigation menu 210, navigation menu 220 may include different prompts. For example, navigation menu 220 includes a prompt Z not found in navigation menu 210. Prompt Z may be included based on a navigation-menu rule (i.e., a logical expression that specifies an element of a configuration of a navigation menu when a condition satisfied). Prompt Z may be included based on account data, activity data, request data, and/or navigation-menu data. For example, although the system may not normally include prompt Z in response to a call, the model may offer prompt Z based on unusual account data (e.g., an unusually large transaction, a past-due medical appointment, etc.).

Navigation menu 220 organizes prompts in a Level 1, a Level 2, and a Level 3. As compared to navigation menu 210, navigation menu 220 may include a different order of prompts at any level. For example, Level 1 of navigation menu 210 includes prompts A, B and C in that order, while Level 1 of navigation menu 220 includes prompts Q, D, P, B, A, and C in that order. Navigation menu 220 may preserve associations of navigation menu 210 between prompts at different levels. As an example, prompt B is associated with the same Level 2 prompts (F, G, and H) in navigation menu 210 and in navigation menu 220, but the order of these Level 2 prompts is not the same for navigation menu 210 as for navigation menu 220

In some embodiments, navigation-menu system 104 may generate navigation menu 210 and/or navigation menu 220 based on account data (e.g., deposit data), request data (e.g., a phone number), activity data (e.g., website visit history), navigation-menu data (e.g., previously selected prompts), and/or navigation-menu rules (e.g., a preferred prompt). In some embodiments, navigation-menu system 104 may generate navigation menus using a model.

As an example, navigation-menu system 104 may generate navigation menu 210 when request data is associated with a first location and generate navigation menu 220 when request data is associated with a second location. The first location may be a place of business and the request data may include a business phone number, an Internet Protocol (IP) address associated with a place of business, and/or location data associated with a place of business (e.g., Global Positioning System (GPS) data). The second location may be a residence, and the request data may include a residential phone number, an IP address associated with a residence, and/or location data associated with a residence.

In the example, account system 106 may be a financial account system and account holders may frequently call or login to account system 106 from a place of business to check an account balance and receive information about recent transactions. However, account holders may frequently call or login from a residence to schedule payments, receive information about recent transactions, and dispute transactions. Navigation-menu system 104 may train a model (e.g., a machine learning model) to generate navigation menu 210 based on request data associated with a place of business and generate navigation menu 220 based on request data associated with a residence.

Advantageously, navigation-menu system 104 generates customized navigation menus configured for efficient navigation. In the previous example, prompt A may include account balance information, prompt D may include recent transaction data, prompt Q may payment information, and prompt P may include dispute information. As shown, navigation menu 210 is configured to provide rapid navigation pathways at least to prompts A and D. Accordingly, in the example, users calling from a place of business may quickly navigate to check an account balance and recent transactions. As shown, navigation menu 220 is configured to provide rapid navigation pathways at least to prompts Q, D, and P. Accordingly, in the example, users calling from a residence may quickly navigate to schedule payments, check recent transactions, and dispute transactions.

FIG. 2 is provided for purposes of illustration only and is not intended to be limiting on the embodiments. Embodiments may include navigation menus that differ from the navigation menus depicted in FIG. 2. For example, navigation menus of the embodiments may include greater or fewer prompts, levels, and/or navigation pathways as compared to the prompts, levels and navigation pathways depicted in FIG. 2. While the examples provided herein may include navigation pathways through simple parent-child relationships between prompts, navigation menus of the embodiments may include complex relationships between prompts that include multiple branching and converging structures, for example. As one of skill in the art will appreciate, navigation-menus of the embodiments may include prompts configured according to any network structure (e.g., any root, parent, leaf, child, or other structure according to tree topology, bus topology, star topology, and/or any other topology).

Figure 3:
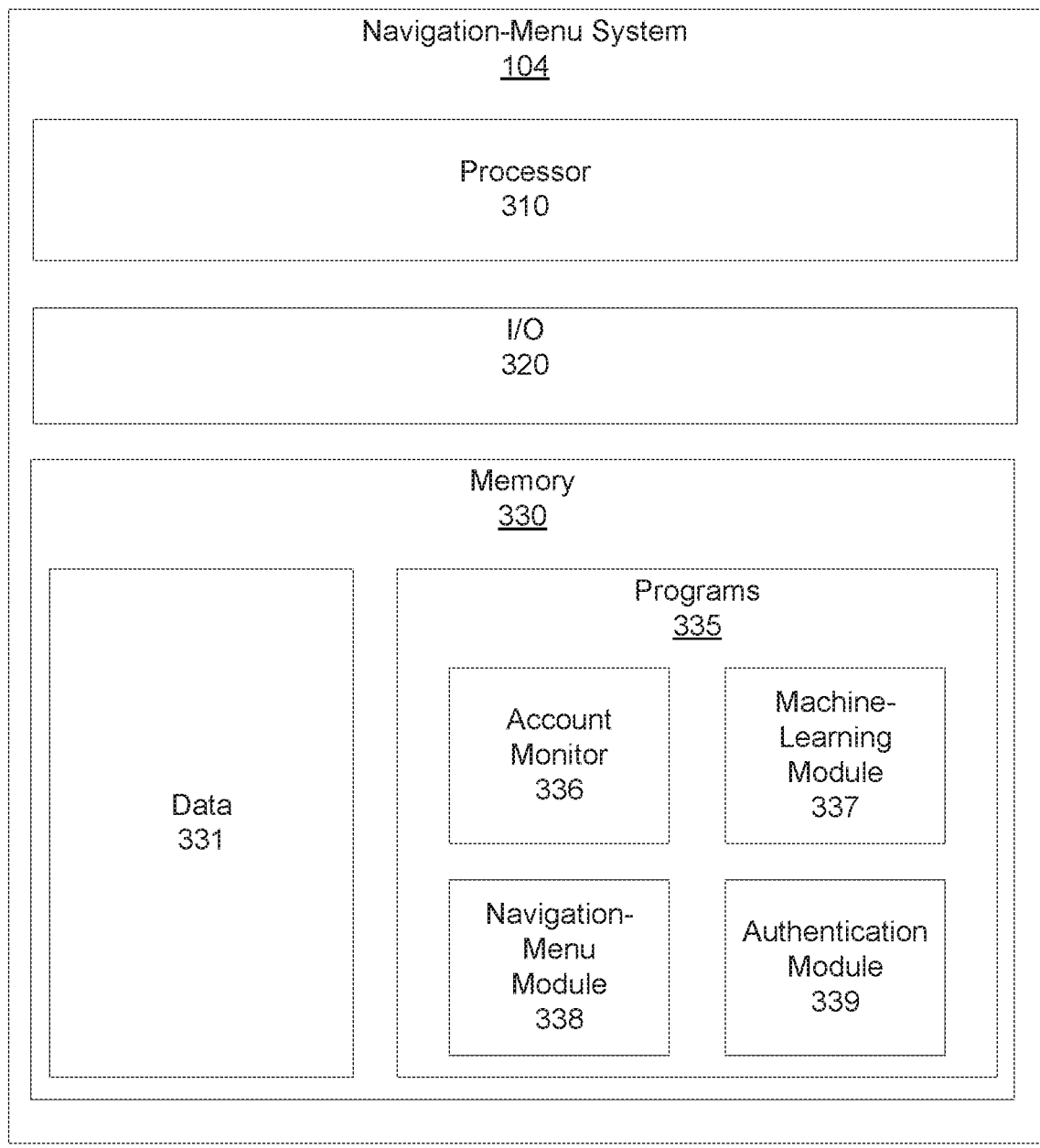
FIG. 3 depicts an exemplary navigation-menu system, consistent with disclosed embodiments.

FIG. 3 depicts an exemplary navigation-menu system 104, consistent with disclosed embodiments. Navigation-menu system 104 may comprise a computing device, a computer, a server, a server cluster, a plurality of clusters, and/or a cloud service, consistent with disclosed embodiments. As shown, navigation-menu system 104 may include one or more processors 310, one or more I/O devices 320, and one or more memory units 330. In some embodiments, some or all components of navigation-menu system 104 may be hosted on a device, a computer, a server, a cluster of servers, or a cloud service. In some embodiments, navigation-menu system 104 may be a scalable system configured to efficiently manage resources and enhance security by provisioning computing resources in response to triggering events and terminating resources after completing a task (e.g., a scalable cloud service that spins up and terminates container instances).

FIG. 3 depicts an exemplary configuration of navigation-menu system 104. As will be appreciated by one skilled in the art, the components and arrangement of components included in navigation-menu system 104 may vary. For example, as compared to the depiction in FIG. 3, navigation-menu system 104 may include a larger or smaller number of processors, I/O devices, or memory units. In addition, navigation-menu system 104 may further include other components or devices not depicted that perform or assist in the performance of one or more processes consistent with the disclosed embodiments. The components and arrangements shown in FIG. 3 are not intended to limit the disclosed embodiments, as the components used to implement the disclosed processes and features may vary.

Processor 310 may comprise known computing processors, including a microprocessor. Processor 310 may constitute a single-core or multiple-core processor that executes parallel processes simultaneously. For example, processor 310 may be a single-core processor configured with virtual processing technologies. In some embodiments, processor 310 may use logical processors to simultaneously execute and control multiple processes. Processor 310 may implement virtual machine technologies, or other known technologies to provide the ability to execute, control, run, manipulate, store, etc., multiple software processes, applications, programs, etc. In another embodiment, processor 310 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor(s) 310. Processor 310 may execute various instructions stored in memory 330 to perform various functions of the disclosed embodiments described in greater detail below. Processor 310 is configured to execute functions written in one or more known programming languages.

I/O devices 320 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 320 may be components of an interface of navigation-menu system 106.

Memory 330 may be a volatile or non-volatile, magnetic, semiconductor, optical, removable, non-removable, or other type of storage device or tangible (i.e., non-transitory) computer-readable medium, consistent with disclosed embodiments. As shown, memory 330 may include data 331, including one of at least one of encrypted data or unencrypted data. Consistent with disclosed embodiments, data 331 may include request data, model data (e.g., model parameters), activity data, account data, navigation-menu data, and/or navigation-menu rule data, consistent with disclosed embodiments.

Programs 335 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 335 may be written in one or more programming or scripting languages. One or more of such software sections or modules of memory 330 may be integrated into a computer system, non-transitory computer-readable media, or existing communications software. Programs 335 may also be implemented or replicated as firmware or circuit logic.

Programs 335 may include an account monitor 336, a machine-learning module 337, and a navigation-menu module 338, an authentication module 339 and/or other modules not depicted to perform methods of the disclosed embodiments. In some embodiments, modules of programs 335 may be configured to generate ("spin up") one or more ephemeral container instances to perform a task and/or to assign a task to a running (warm) container instance, consistent with disclosed embodiments. Modules of programs 335 may be configured to receive, retrieve, and/or generate models, consistent with disclosed embodiments. Modules of programs 335 may be configured to perform operations in coordination with one another.

Account monitor 336 may include programs (scripts, functions, algorithms) to receive data from, retrieve data from, and/or transmit data to other components of system 100 and/or computing components outside system 100. For example, account monitor 336 may be configured to receive data from user device 102, account system 106, and/or third-party system 108. The data may include account data, activity data, navigation-menu data, request data, or other data, consistent with disclosed embodiments. For example, account monitor 336 may be configured to receive a request and retrieve account data from account system 106 based on the request. Account monitor 336 may be configured to send a request to third-party system 108 and receive activity data in response to the request.

In some embodiments, account monitor 336 may be configured to manage data (e.g., monitor, filter, classify, analyze, store, and/or provide data). In some embodiments, account monitor 336 may be configured to manage request data, activity data, navigation-menu data, account data, and/or other data. The data may be associated with a user or an account, consistent with disclosed embodiments. In some embodiments, account monitor 336 may be configured to classify data as relating to one or more accounts, the accounts being associated with one or more respective users. Consistent with disclosed embodiments, account monitor 336 may be configured to train and implement machine learning models to analyze data (e.g., in coordination with machine-learning module 337). Account monitor 336 may include algorithms or models to provide data statistics (e.g., means, variances, ranges, regression results, correlations, covariance, or other data statistics).

Machine-learning module 337 include programs (scripts, functions, algorithms) to train, implement, store, receive, retrieve, and/or transmit one or more machine learning models. The machine learning models may include a neural network model, a recurrent neural network (RNN) model, a deep learning model, a random forest model, a convolutional neural network (CNN) model, a support vector machine model and/or another machine learning model. Models may include an ensemble model (i.e., a model comprised of a plurality of models). In some embodiments, training of a model terminates when a training criterion is satisfied. Training criterion may include a number of epochs, a training time, a performance metric (e.g., an estimate of accuracy in reproducing test data), or the like. Machine-learning module 337 may be configured to adjust model parameters during training. Model parameters may include weights, coefficients, offsets, or the like. Training may be supervised or unsupervised.

Navigation-menu module 338 may include programs (scripts, functions, algorithms), to generate navigation menus. Generating a navigation menu may include selecting prompts to include in the navigation menu. Generating a navigation menu may include setting a configuration of the navigation menu. Generating a navigation menu may be based on account data, activity data, request data, navigation-menu data, and/or navigation-menu rule data, consistent with disclosed embodiments.

Consistent with disclosed embodiments, navigation-menu module 338 may be configured to train, implement, store, retrieve, and/or receive machine learning models to generate navigation menus (e.g., in coordination with machine-learning module 337). Models of navigation-menu module 338 may be configured to generate navigation menus based on account data, activity data, navigation-menu data, and request data. Navigation-menu module 338 may be configured to train a model to estimate the likelihood a prompt will be selected based on account data, activity data, and/or navigation-menu data (e.g., in coordination with machine-learning module 337). Navigation-menu module 338 may be configured to generate navigation menus based on the estimated likelihood a prompt will be selected.

In some embodiments, navigation-menu module 338 may be configured to apply a navigation-menu rule to update a navigation menu generated by a model. A navigation-menu rule may be any logical expression that specifies an element of a configuration of a navigation menu when a condition satisfied, consistent with disclosed embodiments.

Navigation-menu module 338 may be configured to receive instructions to manage (i.e., to generate, modify, and/or delete) navigation-menu rules from components of system 100 and/or from computing components outside system 100. For example, navigation-menu module 338 may receive instructions to manage navigation-menu rules from user device 102.

Navigation-menu module 338 may include algorithms to generate data statistics, i.e., navigation-menu module 338 may be configured to perform univariate statistical methods, multivariate statistical methods, regressions, or other statistical methods. In some embodiments, navigation-menu module 338 may be configured to determine a statistical metric and/or identify a structure (e.g., a data class, a key-value pair, etc.) of account data, request data, activity data, and/or navigation-menu data. Navigation-menu module 338 may be configured to generate a model having a model type (e.g., an RNN model) based on an indication that a previous model of the type satisfied a performance criterion when generating a navigation-menu using similar account data, activity data, and/or navigation.

Navigation-menu module 338 may include programs (e.g., scripts, functions, algorithms) to provide navigation menus. Providing a navigation menu may include storing navigation-menu data, transmitting navigation-menu data (e.g., to a component of system 100 and/or a computing component outside system 100), displaying navigation-menu data, playing a sound based on navigation-menu data, emitting light based on navigation-menu data, and/or the like.

In some embodiments, navigation-menu module 338 may be configured to provide a prompt. Providing a prompt may include routing a signal. A signal may include a call signal, an internet connection signal, and/or any other signal. In some embodiments, navigation-menu system 104 may route a signal based on request data, activity data, navigation-menu data, and/or a navigation-menu rule. For example, navigation-menu system 104 may receive a call from a known phone number to a customer service department and route the call to a pharmacy department using a model, based on the phone number and account data indicating that a prescription is likely to have run out.

In some embodiments, navigation-menu module 338 may be configured to transmit data to conduct an IVR process in coordination with speech-recognition system 112. In some embodiments, navigation-menu module 338 may be configured to select a prompt based on received data and/or generate a navigation menu based on received data. For example, navigation-menu 338 may transmit request data that includes audio data to speech-recognition system 112, receive text data based on the audio data from speech-recognition system 112, and select a prompt based on the received text data.

Authentication module 339 may be configured to conduct an authentication process, consistent with disclosed embodiments. In some embodiments, an authentication process includes transmitting a request to provide a password, a pin, a token, an answer to a secret question, a code, a biometric input, or other authentication data. In some embodiments, an authentication process includes receiving a password, a pin, an answer to a secret question, a code, a biometric input, a token, or other authentication data. In some embodiments, an authentication includes a Completely Automated Public Turing Test to tell Computers and Humans Apart (CAPTCHA) process. In some embodiments, an authentication process includes a multi-factor authentication. In some embodiments, the authentication process may be tokenized.

Figure 4:
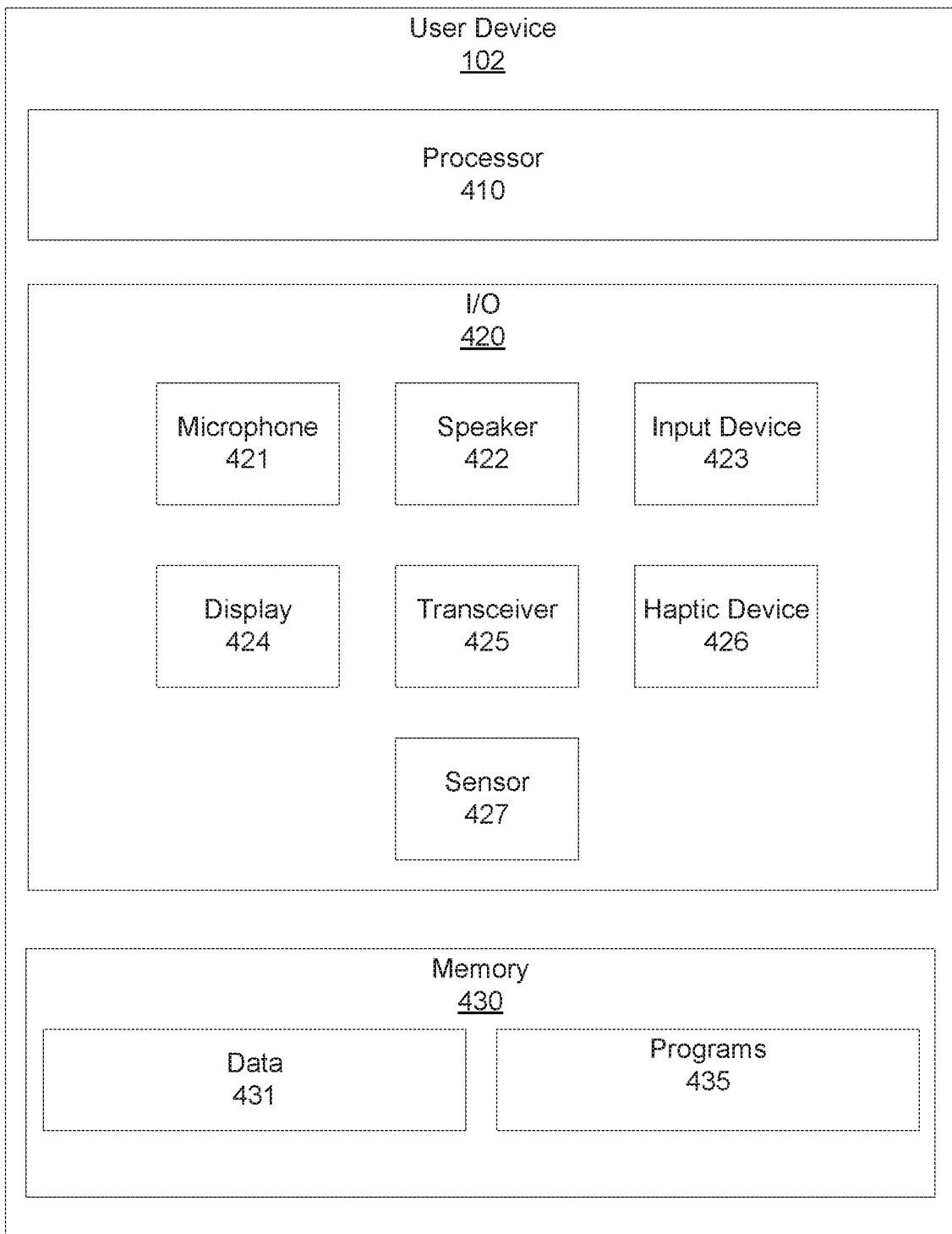
FIG. 4 depicts an exemplary user device, consistent with disclosed embodiments.

FIG. 4 depicts an exemplary user device 102, consistent with disclosed embodiments. User device 102 may be a phone, a mobile device, a tablet, a personal computer, a server, a server cluster, a specialized device configured to perform methods according to disclosed embodiments, or the any other user device.

User device 102 may include one or more processors 410, input/output units (I/O devices) 420, and one or more memory units 430. FIG. 4 is an exemplary configuration of user device 102. As will be appreciated by one skilled in the art, the components and arrangement of components included in user device 102 may vary. For example, as compared to the depiction in FIG. 4, user device 102 may include a larger or smaller number of processors 410, I/O devices 420, or memory units 430. In addition, user device 102 may further include other components or devices not depicted that perform or assist in the performance of one or more processes consistent with the disclosed embodiments. The components and arrangements shown in FIG. 4 are not intended to limit the disclosed embodiments, as the components used to implement the disclosed processes and features may vary.

Processor 410 may include known computing processors, including a microprocessor. Processor 410 may include a single-core or multiple-core processor that executes parallel processes simultaneously. For example, processor 410 may include a single-core processor configured with virtual processing technologies. In some embodiments, processor 410 may use logical processors to simultaneously execute and control multiple processes. Processor 410 may implement virtual machine technologies, or other known technologies to provide the ability to execute, control, run, manipulate, store, etc., multiple software processes, applications, programs, etc. In another embodiment, processor 410 may include a multiple-core processor arrangement (e.g., dual core, quad core, etc.) configured to provide parallel processing functionalities to allow execution of multiple processes simultaneously. One of ordinary skill in the art would understand that other types of processor arrangements may be implemented that provide for the capabilities disclosed herein. The disclosed embodiments are not limited to any type of processor(s) 410. Processor 410 may execute various instructions stored in memory 430 to perform various functions of the disclosed embodiments described in greater detail below. Processor 410 may be configured to execute functions written in one or more known programming languages.

Referring again to FIG. 4, I/O devices 420 may include components of an interface, such as a user interface. I/O devices 420 may include a microphone 421, a speaker 422, an input device 423, a display 424, a transceiver 425, haptic device 426, and/or sensor 427. I/O devices 420 may include other I/O devices, not depicted, that perform or assist in the performance of one or more processes consistent with disclosed embodiments. In some embodiments, some or all of I/O devices 420 may be mounted to user device 102. In some embodiments, some or all of I/O devices 420 may be components of stand-alone devices communicatively coupled to user device 102.

Microphone 421 may be configured to receive an audio signal. In some embodiments, microphone 421 may include a microphone array. Microphone 421 may be mounted to user device 102 or may be communicatively coupled to user device 102 (e.g., a wired headset, wireless microphone, or the like).

Speaker 422 may include components configured to provide audio output. In some embodiments, speaker 422 may include an array of speakers.

Input device 423 may include at least one of a touchpad, a touch screen, a keyboard, a mouse, a track pad, a button, a dial, a knob, a switch, a location sensor, a biometric input device, or the any other input device. As will be appreciated by one of skill in the art, input device 423 may include any device capable of receiving inputs to perform or assist in performing methods consistent with disclosed embodiments.

Display 424 may include a light-emitting component, such as a light emitting diode (LED) or other component capable of providing a visible signal to a user. In some embodiments, display 424 may include at least one of a monitor, an LCD display, an LED display, a touch screen, a lamp, a projector, or another visual display.

Transceiver 425 may include a transceiver configured to connect with at least one of any type of cellular data network, or at least one of a Wi-Fi transceiver, a Li-Fi transceiver, Near Field Communication (NFC) transceiver, a radio transceiver, an ultra-high frequency (UHF) transceiver, a Bluetooth transceiver, an infrared transceiver, or other wireless transceiver.

Haptic device 426 may be configured to provide haptic feedback. For example, haptic device 426 may include a device configured to vibrate (e.g., an eccentric rotating mass actuator and/or a linear resonant actuator), to provide force, or to induce a sense of touch without physical contact of a device (e.g., via an air vortex ring, ultrasound, etc.).

Sensor 427 may include, for example, a location sensor (e.g., a global positioning system (GPS) sensor, a magnetometer, or an altimeter), a camera, a light sensor, an audio sensor, or a motion sensor (e.g., a gyroscope, an accelerometer, a light-based motion detector).

Memory 430 may be a volatile or non-volatile, magnetic, semiconductor, optical, removable, non-removable, or other type of storage device or tangible (i.e., non-transitory) computer-readable medium, consistent with disclosed embodiments. As shown, memory 430 may include data 431, including of at least one of encrypted data or unencrypted data. Data 431 may include one or more model indexes, model parameters, model codes, data indexes, data vectors, and/or datasets, consistent with disclosed embodiments.

Programs 435 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 435 may be written in one or more programming or scripting languages. One or more of such software sections or modules of memory 430 may be integrated into a computer system, non-transitory computer-readable media, or existing communications software. Programs 435 may also be implemented or replicated as firmware or circuit logic.

In some embodiments, programs 435 includes one or more programs to to monitor service requests. For example, programs 435 may be configured to store request data, account data, navigation-menu data, and/or activity data, consistent with disclosed embodiments. Programs 435 may be configured to transmit request data, account data, navigation-menu data, and/or activity data to other components of system 100. Programs 435 may be configured to manage navigation-menu rules, as described above (in reference to navigation-menu module 338).

Figure 5:
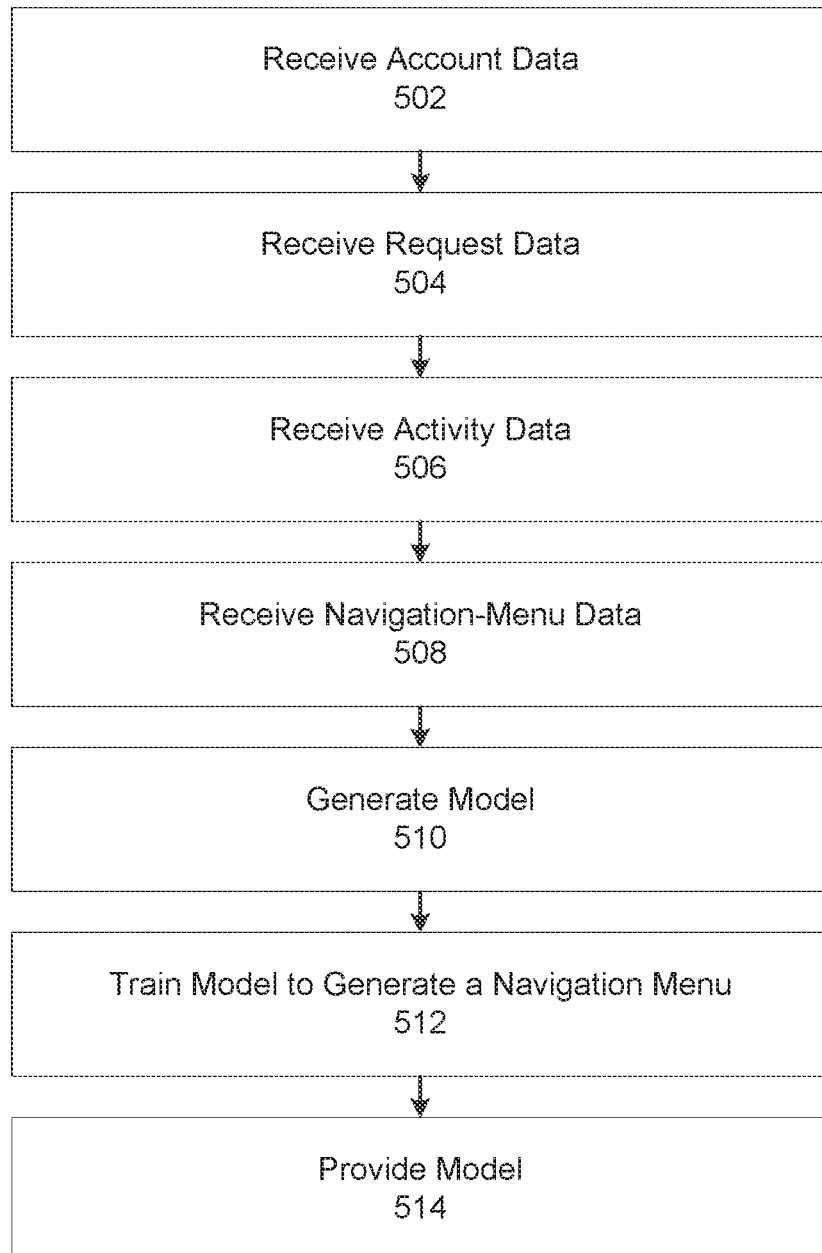
FIG. 5 depicts an exemplary process for training a model to generate a navigation menu, consistent with disclosed embodiments.

FIG. 5 depicts exemplary process 500 for training a model to generate a navigation menu, consistent with disclosed embodiments. In some embodiments, navigation-menu system 104 may perform one or more steps of process 500 using programs 335. One or more of account monitor 336, machine-learning module 337, navigation-menu module 338, authentication module 339, and/or another module of programs 335 may perform operations of process 500, consistent with disclosed embodiments. In some embodiments, account system 106 may perform steps of process 500. In some embodiments, user device 102 may perform steps of process 500. In some embodiments, speech-recognition system 112 may perform steps of process 500.

Consistent with disclosed embodiments, steps of process 500 may be performed on one or more cloud services using one or more ephemeral container instances. For example, at any of the steps of process 500, navigation-menu system 104, account system 106, and/or speech-recognition system 112 may generate (spin up) an ephemeral container instance to execute a task, assign a task to an already-running ephemeral container instance (warm container instance), or terminate a container instance upon completion of a task. As one of skill in the art will appreciate, steps of process 500 may be performed as part of an application interface (API) call. Process 500 may be performed according to a schedule and/or in response to a triggering event (e.g., a received request to generate a model).

At step 502, navigation-menu system 104 may receive account data associated with a plurality of accounts, consistent with disclosed embodiments. In some embodiments, step 502 may include retrieving or receiving account data from account system 106, data 331, database 110, and/or a computing component outside system 100. Account data at step 502 may be associated with one or more users. Account data of step 502 may include any type of account data as previously described and/or other account data.

At step 504, navigation-menu system 104 may receive request data for a plurality of requests associated with a plurality of accounts, consistent with disclosed embodiments. In some embodiments, the request data may be associated with one or more users. In some embodiments, step 504 may include retrieving or receiving request data from account system 106, data 331, database 110, and/or a computing component outside system 100. Request data of step 504 may include any type of request data as previously described or other request data. Step 504 may include transmitting data to and receiving data from speech-recognition module 112, consistent with disclosed embodiments.

At step 506, navigation-menu system may 104 receive activity data associated with one or more users and/or accounts, consistent with disclosed embodiments. In some embodiments, step 506 may include retrieving or receiving activity data from third-party system 108, data 331, database 110, and/or a computing component outside system 100. Activity data of step 506 may include any type of activity data as previously described and/or other activity data.

At step 508, navigation-menu system 104 may receive navigation-menu data for a plurality of requests associated with a plurality of accounts, consistent with disclosed embodiments. In some embodiments, step 508 may include retrieving or receiving navigation-menu data from account system 106, data 331, database 110, and/or a computing component outside system 100. Navigation-menu data of step 508 may include any navigation-menu data as previously described and/or any other navigation-menu data.

At step 510, navigation-menu system 104 may generate a model, consistent with disclosed embodiments. The model may be a machine-learning model. For example, the model may include a neural network model, a recurrent neural network model, a deep learning model, a random forest model, a convolutional neural network model, and/or another machine-learning model. Navigation-menu system 104 may generate a model based on a previously generated model. For example, navigation-menu system 104 may receive or retrieve a model from a data storage (e.g., data 331 and/or database 110), another component of system 100, or a computing component outside system 100 (e.g., a database). In some embodiments, the generated model of step 510 may be a copy of a previously generated model.

Navigation-menu system 104 may generate a model at step 510 based on account data, activity data, and/or navigation-menu data. For example, navigation-menu system 104 may determine a statistical metric and/or identify a structure of account data, request data, activity data, and/or navigation-menu data. Navigation-menu system 104 may generate a model having a model type (e.g., RNN, CNN, random forest, or other model type) based on an indication that a previous model of the type satisfied a performance criterion when generating a navigation-menu using similar account data, activity data, and/or navigation. The model may be an ensemble model. In some embodiments, navigation-menu system 104 generates a plurality of models at step 510.

At step 512, navigation-menu system 104 may train a model to generate a navigation menu, consistent with disclosed embodiments. Generating a navigation menu may include selecting prompts to include in the navigation menu. Generating a navigation menu may include setting a configuration of the navigation menu. Consistent with disclosed embodiments, the navigation menu may have a configuration of prompts and include any navigation-menu data as previously described (e.g., the navigation menu may be an IVR menu).

Navigation-menu system 104 may train the model to estimate the likelihood a prompt will be selected following a service request. The model may be trained to estimate the likelihood based on account data, activity data, and/or navigation-menu data. Navigation-menu system 104 may train a model to generate and/or configure (e.g. order) navigation menus based on the estimated likelihood a prompt will be selected. In some embodiments, at step 512, navigation-menu system 104 may train a model to estimate the likelihood a prompt will be selected and to generate navigation menus. In some embodiments, at step 512, navigation-menu system 104 may train a first model to estimate the likelihood a prompt will be selected and a second model to generate navigation menus.

In some embodiments, training of a model may terminate at step 512 when a training criterion is satisfied. Training criteria may include a number of epochs, a training time, a performance metric (e.g., an estimate of accuracy in predicting the selected prompt), or the like. Step 512 may include adjusting model parameters during training. Model parameters may include weights, coefficients, offsets, or the like. Training at step 512 may be supervised or unsupervised.

At step 514, navigation-menu system 104 may provide a model, consistent with disclosed embodiments. Providing a model at step 514 may include storing the model (e.g., in data 331 and/or database 110), transmitting the model to a component of system 100, transmitting the model to a computing component outside system 100 (e.g., via network 114), and/or displaying the model (e.g., at display of I/O 320). In some embodiments, at step 514, navigation-menu system 104 may provide a first model to estimate the likelihood a prompt will be selected and a second model to generate navigation menus. In some embodiments, at step 514, navigation-menu system 104 may provide one model to estimate the likelihood a prompt will be selected and generate navigation menus. The model may be an ensemble model.

Figure 6:
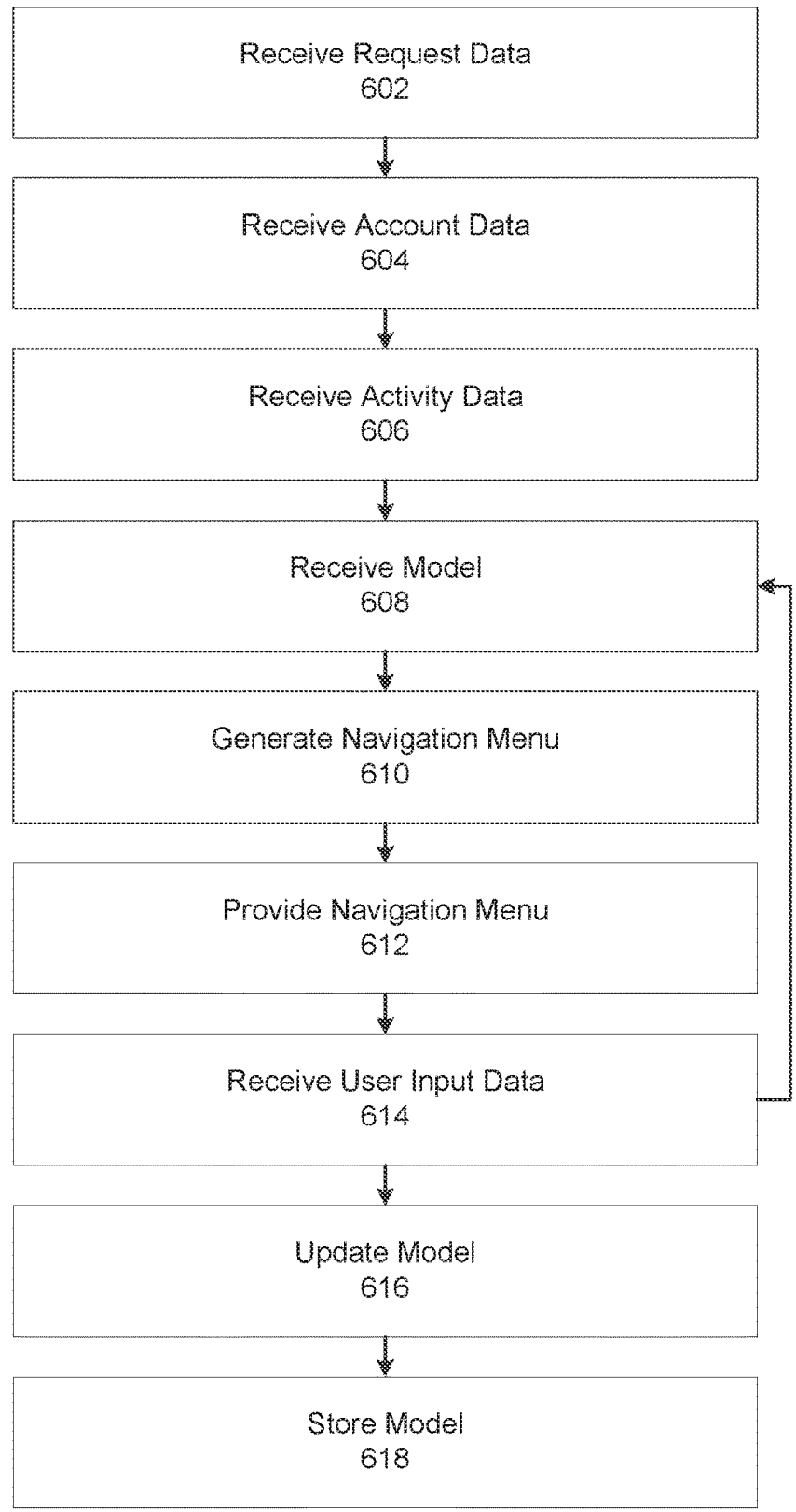
FIG. 6 depicts an exemplary process for generating a navigation menu, consistent with disclosed embodiments.

FIG. 6 depicts exemplary process 600 for generating a navigation menu, consistent with disclosed embodiments. In some embodiments, navigation-menu system 104 may perform one or more steps of process 600 using programs 335. One or more of account monitor 336, machine-learning module 337, navigation-menu module 338 authentication module 339, and/or another module of programs 335 may perform operations of process 600, consistent with disclosed embodiments. In some embodiments, account system 106 may perform steps of process 600. In some embodiments, user device 102 may perform steps of process 600. In some embodiments, speech-recognition system 112 may perform steps of process 600.

Consistent with disclosed embodiments, steps of process 600 may be performed on one or more cloud services using one or more ephemeral container instances. For example, at any of the steps of process 600, navigation-menu system 104, account system 106, and/or speech-recognition system 112 may generate (spin up) an ephemeral container instance to execute a task, assign a task to an already-running ephemeral container instance (warm container instance), or terminate a container instance upon completion of a task. As one of skill in the art will appreciate, steps of process 600 may be performed as part of an application interface (API) call.

At step 602, navigation-menu system 104 may receive request data, consistent with disclosed embodiments. For example, navigation-menu system 104 may receive request data from account system 106 and/or user device 102. In some embodiments, user device 102 may transmit a request to account system 106 and account system 106 may transmit request data associated with the request to navigation-menu system 104. In some embodiments, user device 102 may transmit a request to navigation-menu system 104, and navigation-menu system 104 may generate request data and/or receive request data associated with the request. Request data of step 602 may include any request data as previously described and/or other request data (e.g., IVR data comprising a response to a prompt).

At step 604, navigation-menu system 104 may receive account data based on the request, consistent with disclosed embodiments. Based on the request, navigation-menu system 104 may retrieve or receive account data from account system 106, data 331, database 110, and/or a computing component outside system 100. Account data of step 604 may include any account data as previously described and/or other account data.

At step 606, navigation-menu system 104 may receive activity data associated with the account, consistent with disclosed embodiments. In some embodiments, navigation-menu system 104 may retrieve or receive activity data from third-party system 108, data 331, database 110, and/or a computing component outside system 100. In some embodiments, the activity data may include at least one of location data, cookie data, website history data, viewing history data (e.g., online video streaming activity), shopping history data, transaction data, internet search data, social media data, or other activity data.

At step 608, navigation-menu system 104 may receive a model, consistent with disclosed embodiments. In some embodiments, step 608 may include implementing process 500 to generate and train a model. In some embodiments, step 608 may include generating a statistical metric and/or identifying a structure of account data, request data, and/or activity data. In some embodiments, step 608 may include selecting a previously trained model based on the statistical metric and/or structure of the account data, request data, and/or activity data.

At step 610, navigation-menu system 104 may generate a navigation menu using the model, consistent with disclosed embodiments. Generating a navigation menu may include selecting prompts to include in the navigation menu. Generating a navigation menu may include setting a configuration of the navigation menu. A navigation menu of step 610 may include any navigation menu as previously described and/or another navigation menu (e.g., an IVR menu). Navigation-menu system 104 may generate a navigation menu at step 610 using the model based on request data, account data, activity data, and/or a navigation-menu rule, consistent with disclosed embodiments. A navigation-menu rule of step 610 may include any navigation-menu rule as previously described and/or another navigation-menu rule. Generating a navigation menu may include transmitting data to and receiving data from speech-recognition module 112, consistent with disclosed embodiments.

At step 612, navigation-menu system 104 may provide the navigation menu, consistent with disclosed embodiments. Providing a navigation menu may include storing a navigation menu, transmitting a navigation menu to a component of system 100, transmitting a navigation menu to a computing component outside system 100 (e.g., via network 114), displaying a navigation menu, playing a sound, emitting light, and the like. In some embodiments, providing a navigation menu may include providing a prompt. In some embodiments, providing a prompt may include routing a signal (e.g., a call signal, an internet connection signal, and/or any other signal).

At step 614, navigation-menu system 104 may receive input data, consistent with disclosed embodiments. In some embodiments, the input may be received from user device 102 and/or account system 106. In some embodiments, input data may include navigation-menu data (e.g., a prompt selection). In some embodiments, input data may include request data. For example, input data may include information relating to a service request such as a desired outcome, a scheduling preference, data relating to an account event, or the like. Receiving input data may include transmitting data to and receiving input data from speech-recognition module 112, consistent with disclosed embodiments.

As shown in FIG. 6, steps 608 to 614 may be repeated one or more times. For example, based on the user input of step 614, navigation menu system 104 may receive a model and/or generate a different navigation menu using the model (steps 608 and 610).

At step 616, navigation-menu system 104 may update the model based on the user input, consistent with disclosed embodiments. For example, the user input may include navigation-menu data, and navigation-menu system 104 may train the model may be trained using the navigation-menu data.

At step 618, navigation-menu system 104 may store the model, consistent with disclosed embodiments. For example, navigation-menu system 104 may store the model in data 331 and/or database 110. In some embodiments, step 618 include, transmitting the model to a component of system 100 and/or transmitting the model to a computing component outside system 100.

Figure 7:
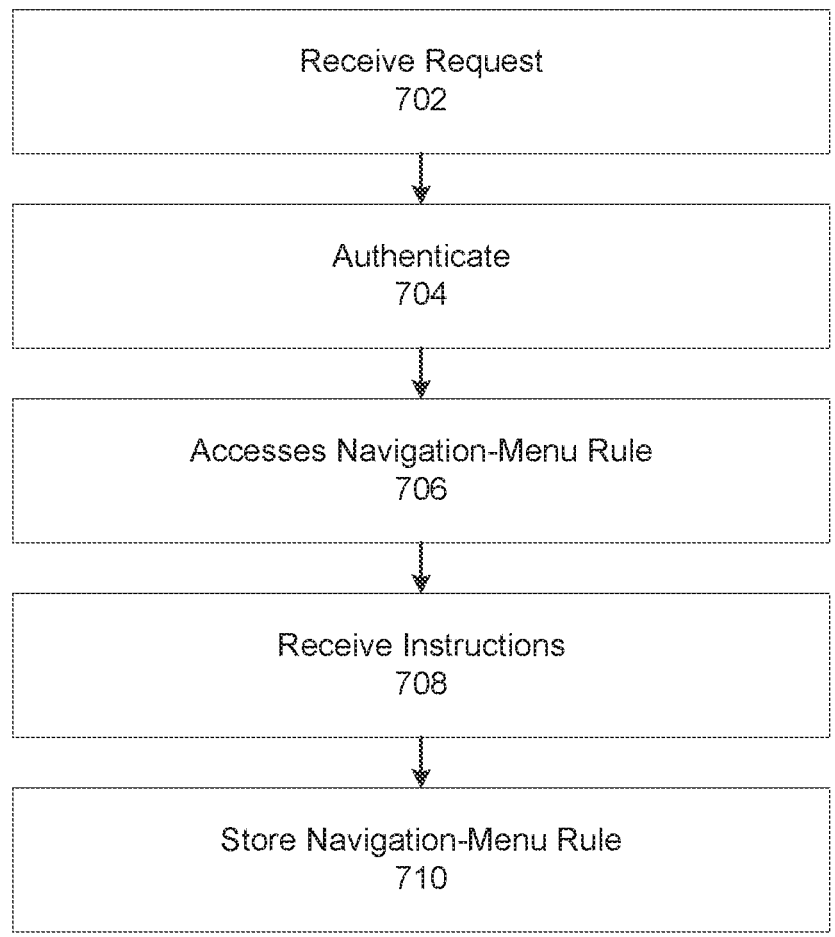
FIG. 7 depicts an exemplary process to view, create, update, or delete a navigation-menu rule, consistent with disclosed embodiments.

FIG. 7 depicts exemplary process 700 to view, create, update, or delete a navigation-menu rule, consistent with disclosed embodiments. Consistent with disclosed embodiments, a navigation-menu rule may be any logical expression that specifies an element of a configuration of a navigation menu when a condition satisfied. In some embodiments, navigation-menu system 104 may perform one or more steps of process 700 using programs 335. One or more of account monitor 336, machine-learning module 337, navigation-menu module 338, authentication module 339, and/or another module of programs 335 may perform operations of process 700, consistent with disclosed embodiments. In some embodiments, account system 106 may perform steps of process 700.

At step 702, navigation-menu system 104 may receive a request, consistent with disclosed embodiments. In some embodiments, the request may be received from a user device (e.g., user device 102). In some embodiments, the request may include a request to view, create, update, or delete navigation-menu rules.

At step 704, navigation-menu system 104 may conduct an authentication process, consistent with disclosed embodiments. In some embodiments, the authentication process may include transmitting a request to provide a password, a pin, a token, an answer to a secret question, a code, a biometric input, or other authentication data. In some embodiments, the process may include receiving a password, a pin, an answer to a secret question, a code, a biometric input, a token, or other authentication data. In some embodiments, the authentication may include a Completely Automated Public Turing Test to tell Computers and Humans Apart (CAPTCHA) process. In some embodiments, the authentication process may include a multi-factor authentication. In some embodiments, the authentication process may be tokenized. Conducting an authentication process at step 704 may include transmitting data to and receiving data from speech-recognition module 112, consistent with disclosed embodiments.

At step 706, navigation-menu system 104 may access navigation-menu rules based on the authentication process, consistent with disclosed embodiments. For example, navigation-menu system may receive and/or retrieve navigation-menu rules from a data storage (e.g., data 331 and/or database 110) and/or account system 106.

At step 708, navigation-menu system 104 may receive instructions, consistent with disclosed embodiments. In some embodiments, the instructions may include an instruction to create, modify, or delete a navigation menu rule. In some embodiments, the instructions are received as part of the request of step 702. Step 708 may include transmitting data to and receiving data from speech-recognition module 112, consistent with disclosed embodiments.

At step 710, navigation-menu system 104 may store a navigation-menu rule, consistent with disclosed embodiments. In some embodiments, step 710 may include storing a navigation-menu rule includes in a data storage (e.g., data 331 and/or database 110). In some embodiments, step 710 may include transmitting a navigation-menu rule to account system 106 and/or a user device.

Figure 8:
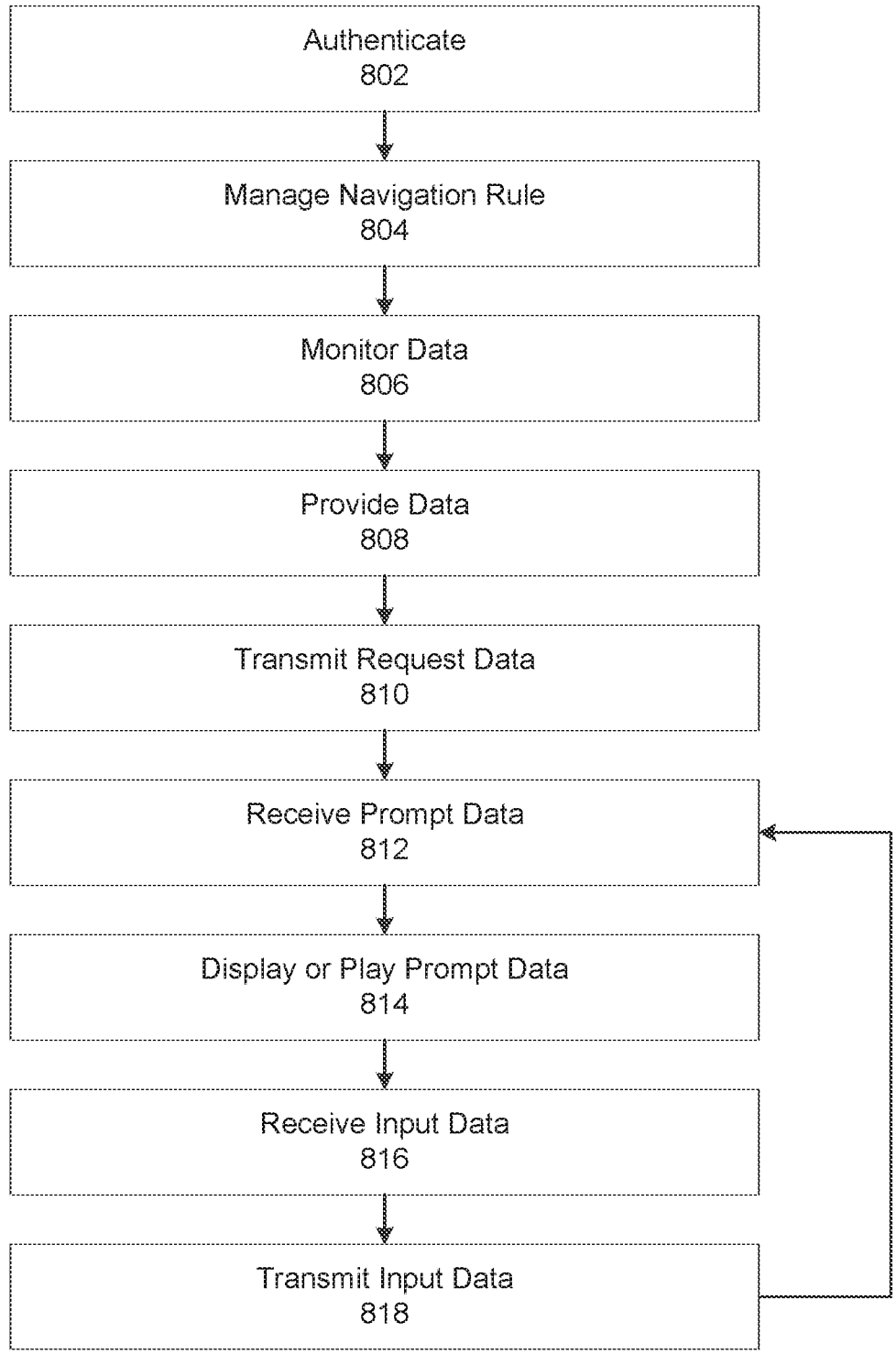
FIG. 8 depicts an exemplary process for activating a user account, consistent with disclosed embodiments.

FIG. 8 depicts an exemplary process 800 for activating a user account, consistent with disclosed embodiments. In some embodiments, a user device 102 may perform steps of process 800, consistent with disclosed embodiments. In some embodiments, account system 106 may perform steps of process 800.

At step 802, user device 102 may conduct an authentication process, consistent with disclosed embodiments. The authentication process may include an authentication process as previously described and/or any other authentication process.

At step 804, the user device 102 may manage a navigation-menu rule based on the authentication process, consistent with disclosed embodiments. Managing a navigation-menu rule may include providing instructions to create, modify, and/or delete a navigation-menu rule.

At step 806, user device 102 may monitor data, consistent with disclosed embodiments. Monitoring data at step 806 may include monitoring request data, activity data, account data, and/or navigation-menu data. Monitoring data may include collecting, storing, and/or analyzing data. Monitoring data may include collecting data using any of I/O devices 420 (e.g., microphone 421, input device 423, sensor 427, or another I/O device).

At step 808, user device 102 may provide data, consistent with disclosed embodiments. Providing data at step 808 may include transmitting request data, activity data, account data, and/or navigation-menu data to another component of system 100.

At step 810, user device 102 may transmit request data associated with a request for an account service to at least one of navigation-menu system 104 or account system 106. Transmitting request data may include placing a call, logging into an account, visiting a website, sending a message (e.g., an email, a text message, a chat message, or the like). Request data of step 810 may include any type of request data as previously described or other request data.

At step 812, user device 102 may receive prompt data, consistent with disclosed embodiments. Step 812 may include receiving a navigation menu, consistent with disclosed embodiments. Receiving prompt data at step 812 may include receiving prompt data from navigation-menu system 104 and/or account system 106. In some embodiments, navigation menu system 104 may perform steps of process 600 based on the request transmitted at step 810 and transmit prompt data to the user device at step 812

At step 814 user device 102 may display or play prompt data, consistent with disclosed embodiments. For example, the user device may display prompt data using speaker 422. The user device may display prompt data using display 424. In some embodiments, step 814 may include providing haptic feedback via haptic device 426.

At step 816 user device 102 may receive input data, consistent with disclosed embodiments. In some embodiments, step 816 may include receiving input from microphone 421, input device 423, and/or sensor 427. In some embodiments, input data may include navigation-menu data (e.g., a prompt selection). In some embodiments, input data may include request data. For example, input data may include information relating to a service request such as a desired outcome, a scheduling preference, data relating to an account event, or the like.

At step 818 user device 102 may transmit input data to at least one of navigation-menu system 104 or account system 106, consistent with disclosed embodiments.

As shown in FIG. 8, steps 812 to 818 may be repeated one or more times. For example, based on the user input (step 816), navigation menu system 104 may provide additional or different prompt data (step 812). In some embodiments, navigation menu system 104 may perform steps of process 600 based on the input data transmitted at step 818.

It should be noted that account system 106 may be configured to perform any of the steps described in reference to navigation-menu system 104 and/or user device 102 including, for example, steps of process 500, 600, 700, and 800. In some embodiments, navigation-menu system 104 may provide a model to account system 106, and account system 106 may train and/or implement the model to generate and provide navigation menus. In some embodiments, account system 106 may be configured to train and implement a model to generate and/or to provide navigation menus.

Systems and methods disclosed herein involve unconventional improvements over conventional data processing approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for generating navigation menus, comprising:
one or more memory units storing instructions; and
one or more processors that execute the instructions to perform operations comprising:
receiving account data associated with a plurality of accounts, the account data comprising at least one selected from the group of account status data, account event data, and transaction data;
receiving navigation-menu data comprising Interactive Voice Response data, the navigation-menu data being associated with the accounts and comprising data specifying a configuration of one or more prompts and prompt data, wherein the prompt data includes at least one selected from the group of audio data, text data, numeric data, image data, video data, and Interactive Voice Response data;
training a model based on the account data and the navigation-menu data;
receiving request data associated with a user, the request data comprising a call signal;
receiving user-account data associated with the user;
generating, using the model, a navigation menu based on the request data and the user-account data, wherein generating the navigation menu comprises setting the configuration of the navigation menu based on likelihoods associated with prompts of the navigation menu;
providing the navigation menu, wherein providing comprises routing the call signal prior to providing the prompts of the navigation menu;
receiving user input selecting a prompt of the navigation menu;

generating, using the model, an updated navigation menu based on the selected prompt; and providing the updated navigation menu.

2. The system of claim 1, wherein:

the operations further comprise receiving activity data associated with the plurality of accounts; and training the model is based on the activity data.

3. The system of claim 2, wherein:

the operations further comprise receiving user-activity data associated with the user; and generating the navigation menu is based on the user-activity data.

4. The system of claim 3, wherein receiving user-activity data comprises receiving user-activity data from at least one of a user device or a third-party system.

5. The system of claim 2, wherein receiving activity data comprises receiving activity data from a third-party system.

6. The system of claim 1, wherein the model comprises at least one of a neural network model, a recurrent neural network (RNN) model, a deep learning model, a random forest model, a convolutional neural network (CNN) model, or a support vector machine model.

7. The system of claim 1, wherein:

training the model comprises training the model to estimate the likelihood a prompt will be selected; and generating the navigation menu comprises:

estimating respective likelihoods a plurality of prompts will be selected; and setting a configuration of the navigation menu based on the respective likelihoods.

8. The system of claim 1, wherein:

the operations further comprise generating the model; and training the model is based on the generated model.

9. The system of claim 1, wherein providing the navigation menu comprises:

transmitting, to a user device, audio data based on the navigation menu.

10. The system of claim 1, wherein:

the request is received from a device associated with a user account; and generating the navigation menu is based on an identification of the device.

11. The system of claim 1, the operations further comprising:

receiving user input based on the navigation menu; and updating the model based on the user input.

12. The system of claim 1, the operations further comprising:

storing the model in a data storage.

13. The system of claim 1, wherein the plurality of accounts comprise financial accounts.

14. The system of claim 1, wherein the plurality of accounts comprise messaging accounts.

15. The system of claim 1, wherein receiving the request comprises receiving the request at a cloud service.

16. A method for generating navigation menus comprising, the following operations performed by one or more servers:

receiving account data associated with a plurality of accounts, the account data comprising at least one selected from the group of account status data, account event data, and transaction data;

receiving navigation-menu data comprising Interactive Voice Response data, the navigation-menu data being associated with the accounts and comprising data specifying a configuration of one or more prompts and prompt data, wherein the prompt data includes at least one selected from the group of audio data, text data, numeric data, image data, video data, and Interactive Voice Response data;

training a model based on the account data and the navigation-menu data;

receiving request data associated with a user, the request data comprising a call signal;

receiving user-account data associated with the user;

generating, using the model, a navigation menu based on the request data and the user-account data, wherein generating the navigation menu comprises setting the configuration of the navigation menu based on likelihoods associated with prompts of the navigation menu;

providing the navigation menu, wherein providing comprises routing the call signal prior to providing the prompts of the navigation menu;

receiving user input selecting a prompt of the navigation menu;

generating, using the model, an updated navigation menu based on the selected prompt; and providing the updated navigation menu.

17. A system for generating navigation menus comprising:

one or more memory units storing instructions; and one or more processors that execute the instructions to perform operations comprising:

receiving account data associated with a plurality of accounts, the account data comprising at least one selected from the group of account status data, account event data, and transaction data;

receiving request data associated with the accounts;

receiving navigation-menu data comprising Interactive Voice Response data, the navigation-menu data being associated with the accounts and comprising data specifying a configuration of one or more prompts and prompt data, wherein the prompt data includes at least one selected from the group of audio data, text data, numeric data, image data, video data, and Interactive Voice Response data;

receiving activity data associated with the plurality of accounts; and training a model based on the account data, the request data, the navigation-menu data, and the activity data;

receiving user-request data associated with a user and a user device, the request data comprising a call signal;

receiving user-account data associated with the user;

receiving user-activity data associated with the user, the user-activity data comprising at least one of user-location data or user-behavior data;

estimating, using the model, respective likelihoods a plurality of prompts will be selected;

generating a navigation menu based on the user-request data, the user-account data, the user-activity data, and the respective likelihoods, wherein generating the navigation menu comprises setting the configuration of the navigation menu based on likelihoods associated with prompts of the navigation menu;

routing a call signal prior to providing the prompts of the navigation menu;

transmitting audio data based on the navigation menu to the user device;

receiving user input selecting a prompt of the navigation menu;

generating, using the model, an updated navigation menu based on the selected prompt; and transmitting audio data based on the updated navigation menu.

18. The system of claim 1, wherein generating the navigation menu is based on a navigation-menu rule comprising a logical expression specifying an element of a configuration of a navigation menu when a condition satisfied.

19. The system of claim 18, wherein the condition comprises determining that the request data is associated with at least one selected from the group of a phone number, a location, and an Internet Protocol address.

20. The system of claim 18, wherein:
the account data comprises account status data indicative of whether an account associated with the user is past due, and
the condition comprises evaluating the account data status to determine whether the account associated with the user is past due.

* * * * *